United States Patent Office 3,466,195
Patented Sept. 9, 1969

3,466,195
ALKALINE CELL CONTAINING SILICATE IONS IN THE ELECTROLYTE
Patrick J. Spellman, Madison, Wis., and John A. Youngquist, Haddonfield, N.J., assignors, by mesne assignments, to ESB Incorporated, Philadelphia, Pa., a corporation of Delaware
No Drawing. Filed July 20, 1966, Ser. No. 566,475
Int. Cl. H01m 43/02, 19/00
U.S. Cl. 136—30                              14 Claims

ABSTRACT OF THE DISCLOSURE

An alkaline cell containing silicate ions in the electrolyte which is characterized by an improved initial capacity and improved stability during storage and a limited amount of alkaline electrolyte sufficient only to provide wetting of the cell components without establishing a liquid level of electrolyte in the cell.

---

This invention relates to an alkaline cell, and in particular, to an alkaline cell containing silicate ions in the alkaline electrolyte which is characterized by an improved initial capacity and improved stability during storage or shelf life.

In the electric battery art, it is well known that alkaline cells comprising a positive active material, a negative active material, a separator and an alkaline electrolyte are unstable during storage, and particularly at high temperatures. During storage, the highly reactive negative active material tends to oxidize which reduces its electrochemical capacity, and therefore, the capacity of the cell is also reduced. In addition, some separator materials also tend to oxidize during storage, particularly cellulosic separator materials, causing separator deterioration and in extreme cases short circuiting of the cell. This problem of instability during storage is particularly troublesome in primary cells which are not rechargeable, since the capacity lost during storage cannot be recovered. As a result, alkaline primary cells which are stored for substantial periods of time have a reduced capacity and are likely to give poor service life.

In the battery art, there are several patents disclosing alkaline cells in which silicates are employed in one of the cell components. These patents do not disclose that an alkaline cell having improved initial capacity and improved stability during storage can be provided by silicate ions in the electrolyte, and for other reasons set forth below, these patents do not anticipate this invention. U.S. Patent No. 858,862, issued to Thomas Edison on July 2, 1907, relates to an alkaline battery wherein one of the active materials (zinc) dissolves in the electrolyte during the discharge, such as the well known Lalande system. The Edison invention was based on the discovery that the addition of an alkaline silicate to the electrolyte increased the solvent power of the electrolyte for zinc. Since the efficiency of this Lalande system depends upon the solubility of the zinc active material in the electrolyte, free electrolyte (i.e., not limited to electrolyte contained in the separator and electrodes) sufficient to dissolve substantially all of the zinc active material during discharge is used in this type of system, and the Edison invention permitted a reduction in the amount of electrolyte required to dissolve the zinc. In contrast thereto, alkaline cells made in accordance with the present invention utilize a limited amount of electrolyte which is sufficient only to provide wetting of cell components without establishing a liquid level of electrolyte, and the alkaline electrolyte is substantially saturated with zincate prior to discharge of the cell in order to inhibit dissolution of the zinc active material in the alkaline electrolyte.

U.S. Patent No. 2,941,909, issued to Theodore B. Johnson et al. on June 21, 1960, also relates to incorporating an alkali metal silicate in the alkaline electrolyte of a primary cell. The Johnson et al. patent is limited to cells having a titanium negative active material, and it discloses that the alkali metal silicate enables the cells to provide higher currents at higher voltages over a wide temperature range. The patent also states that the silicate appears to increase the solubility of the negative active material (anode) and to change the form of the solid anode products, similar to the Edison disclosure.

The above-mentioned patents disclose incorporating an alkali metal silicate in the alkaline electrolyte of primary cells to increase the solubility of the negative active material in the electrolyte, whereas cells of this invention are provided with zincate in the electrolyte at the time of cell assembly to inhibit the solubility of the negative active material in the electrolyte. U.S. Patent No. 2,962,540, issued to Karl Kordesch on November 29, 1960, also relates to incorporating a silicate into an alkaline primary cell. Kordesch discloses a method for bonding the positive active material by incorporating a silicate binder matrix into the positive active material. The silicate binder employed by Kordesch is essentially insoluble in the alkaline electrolyte, for as disclosed in the patent, the silicates "do not affect cell operation, owing to their inertness to the ambient electrolyte," and therefore, these insoluble silicates do not provide an effective amount of silicate ion in the alkaline electrolyte at the time the cell components are thoroughly wetted by the electrolyte.

It is an object of this invention to provide an alkaline cell having improved stability during storage or shelf life, particularly at high temperatures.

Another object of the invention is to provide an alkaline cell having improved initial capacity.

A further object is to provide an improved silver oxide-zinc alkaline cell.

A still further object of the invention is to provide a method for improving the capacity and/or the stability during storage or shelf life of an alkaline cell.

Other objects and advantages of this invention may be determined from the following clear and complete description of the invention.

It has been discovered that certain alkaline cells containing silicate ions in the alkaline electrolyte have improved initial capacity and improved stability during storage or shelf life. The silicate ions may be formed in the electrolyte of such cells by incorporating a soluble silicon additive into at least one of the cell components. The alkaline cells of this invention generally comprise a positive active material, a zinc negative active material, a separator placed between the positive active material and the zinc negative active material, and a limited amount of alkaline electrolyte sufficient only to provide wetting of the cell components without establishing a liquid level of electrolyte in the cell, said electrolyte containing a substantial amount of zinc in the form of zincate ions and at least about 0.05% by weight of silicate ions.

An important feature of the present invention is the provision of a soluble silicon additive which is sufficiently soluble in the alkaline electrolyte to provide silicate ions in an amount of at least about 0.05% by weight of the electrolyte at the time the cell components are thoroughly wetted by the electrolyte. The cells embodying the present invention are made in conventional manner, and cells as they come off the assembly line generally require additional time, such as a day or more, for the electrolyte to thoroughly wet the assembly of cell components and to receive the aforesaid silicate ions where soluble silicon additives have been incorporated in one of the cell components other than the alkaline electrolyte. This feature, i.e., provision of at least about 0.05% by weight of silicate ions in the electrolyte at the time of assembly, clearly distinguishes alkaline cells made in accordance with this invention from those described in the Kordesch patent which contain an insoluble silicate binder in the positive active material but do not contain an effective amount of silicate ions in the electrolyte at the time the cell components are thoroughly wetted by the electrolyte. It is important that the electrolyte contain the silicate ions soon after assembly of the cell in order to provide improved initial capacity and to inhibit deterioration of the separator during storage.

Since the silicon additives which are effective in providing alkaline cells having improved initial capacity and improved stability during storage are those which are soluble in the alkaline electrolyte and provide at least the minimum concentration of silicate ions therein, they may be referred to as soluble silicon additives or as silicate ion precursors. Soluble silicon additives which have been found to be particularly effective are silica ($SiO_2$), potassium silicate ($K_2SiO_3$), sodium silicate ($Na_2SiO_3$), and elemental silicon (Si) may also be used. In addition, silicon compounds such as silicon tetrachloride ($SiCl_4$) and silanes can be used to treat one of the cell components, as for example the separator material, and in this manner, they are incorporated into the cell where they form silicate ions when contacted by the alkaline electrolyte. The soluble silicon additive incorporated into an alkaline cell in accordance with this invention should not include elements which will adversely affect the cell performance.

It should be noted that the soluble silicon additive can be added to the alkaline electrolyte prior to introducing it into the cell, and in this case, the electrolyte may be heated, if desired, to increase the rate of solution of the silicon additive. In this manner, relatively insoluble silicates can be used to provide silicate ions in the electrolyte for their solubility increases in hot electrolyte. Upon cooling the electrolyte, a soluble silicate will remain dissolved in the alkaline electrolyte solution.

It is essential that the soluble silicon additive which is incorporated into the alkaline cell readily form an effective amount of silicate ion when it comes into contact with the alkaline electrolyte. It has been found that very small amounts of silicate ion will provide some improvement in the initial capacity and the stability during storage, but in order to effect a significant improvement, the electrolyte should contain at least about 0.05%, and preferably at least about 0.1% silicate ion by weight of alkaline electrolyte. The optimum amount of silicate ion required to improve initial capacity and stability during storage will vary depending upon electrode materials, electrolyte concentration, cell size and the particular application for which the cell be used. It has also been determined that the silicate ions tends to increase the cell impedance, and therefore, the amount of silicate ion in the electrolyte should be kept to the minimum amount required to significantly improve stability during storage and initial capacity. Where the cell impedance is not a critical factor, e.g., at very low discharge rates, greater amounts of the silicate ion can be tolerated. It should be noted that the concentration of silica ions in the electrolyte is a convenient way to indicate how much soluble silicon additive is incorporated into the cell regardless of the component to which it is added, and the 0.0% minimum concentration refers to silicate ions provided solely by the soluble silicon additive.

The positive electrode of an alkaline cell made in accordance with this invention generally comprises an active material such as silver oxide, mercuric oxide, manganese dioxide or cupric oxide, though it is not limited to these particular materials. The positive active material is generally used in the form of finely divided particles. Many of the postive active materials have poor electrical conductivity, and therefore, it is conventional practice to incorporate a conductive ingredient such as graphite, carbon black or acetylene black particles into the positive active material.

The negative electrode is prepared from zinc active material and may be in the form of zinc foil or finely divided zinc particles. It is generally preferred that the zinc active material should be amalgamated regardless of the form in which it is used. Examination of discharged alkaline cells containing a soluble silicon additive indicated that the silicate ions in the electrolyte affected the reaction of the zinc active material, for the zinc oxide (discharge product) was more granular and appeared to have greater surface area in the cells containing the soluble silicon additive.

Between the positive electrode and the zinc negative electrode, there is placed a separator which may comprise any of the materials conventionally used as separators for alkaline cells. Generally, the separator is made from a cellulosic material, but non-cellulosics such as microporous polyethylene may also be used. It is conventional to use a plurality of layers of separator material including an absorbent material for holding electrolye and one or more layers of barrier material for preventing the passage of metallic ions from one electrode to the other. Cellophane is generally used as the barrier material in alkaline cells. It has been found that the presence of silicate ions in the alkaline electrolyte also improves the stability of the cellulosic material during storage.

The cells of this invention utilize a conventional alkaline electrolyte, such as a solution of potassium or sodium hydroxide with potassium hydroxide being preferred, which is present in an amount sufficient only to provide wetting of the cell components and without establishing in the cell a liquid level of free electrolyte, i.e., the electrolyte is contained substantially wholly within the separator and the positive and negative electrodes. Cells of this invention may also employ a combination zinc negative active material-electrolyte member such as disclosed in U.S. Patent No. 2,593,893, issued to Bernard H. King on April 22, 1952.

The alkaline electrolyte may be prepared as described in U.S. Patent No. 2,422,045 issued to Samuel Ruben on June 10, 1947, and contains in solution a substantial quantity of zinc in the form of zincate ions. Alkaline electrolytes generally have alkali concentrations ranging from 20 to 50% by weight. If the alkaline solution is not initially saturated with zincate, a portion of the zinc active material may be dissolved during storage until the electrolyte becomes saturated with zincate. Also, the zinc hydroxide formed on the zinc negative active material during initial discharge of the cell may be dissolved until the electrolyte becomes saturated with zincate. In any event, it is preferred to start with electrolyte which is substantially saturated (more than 50%) with zincate in order to inhibit dissolution of the zinc active material.

As previously indicated, the soluble silicon additives have been found to be effective for improving initial capacity and stability during storage whether added to the positive active material, zinc negative active material, separator or the alkaline electrolyte. It is generally preferred to add the soluble silicon additive directly to the electrolyte where it readily forms silicate ions, for in this manner, the silicate concentration in the electrolyte can be more exactly controlled.

The soluble additives used in accordance with this invention improve the initial capacity of the cells and the stability during storage or shelf life. As a result of the improvement in both initial capacity and stability during storage, alkaline cells of this invention have substantially improved service life (capacity) after long periods of shelf life as compared to cells which do not contain an effective concentration of silicate ions in the electrolyte.

The improvement in stability during storage and initial capacity for alkaline primary cells containing a soluble silicon additive in accordance with this invention will be demonstrated in the following examples in which the percentages by weight of the soluble silicon additive are based on the weight of the cell component to which the additive is added unless otherwise specified. The size of the cells which were tested are given as National Bureau of Standards (N.B.S.) sizes if such a size has been established.

Example I

The addition of a soluble silicon additive to alkaline electrolyte was tested for a N.B.S. size S–5 silver oxide ($Ag_2O$)-zinc cell, which is used to supply power for hearing aids. 0.07 gram of alkaline electrolyte solution containing about 46% by weight of KOH and about 10% by weight of ZnO was used in each cell. About 0.11 gram of zinc negative active material and about 0.45 gram of silver oxide positive active material were used in each cell. The cells were subjected to a 1,500 ohm discharge for 16 hours per day, and the initial capacity and the capacity after storage for 12 weeks at 113° F. were determined. The following results are reported in hours to a specified voltage endpoint and each result represents a 3 cell average:

| Additive | Amount gm./liter | Initial 1.40 v. | Initial 0.90 v. | 12 wks. at 113° F. 1.40 v. | 12 wks. at 113° F. 0.90 v. |
|---|---|---|---|---|---|
| None | | 57.0 | 72.4 | 37.1 | 49.6 |
| $Na_2SiO_3 \cdot H_2O$ | 10 | 63.5 | 77.4 | 51.3 | 65.0 |
| $K_2SiO_3$ | 10 | 69.2 | 73.9 | 56.6 | 67.1 |
| $SiO_2$ | 1.7 | 59.4 | 75.1 | 43.1 | 65.6 |

These results clearly indicate that the presence of silicate ions in the electrolyte improved the initial capacity of the alkaline cells, and in addition, improved the stability of the cells during storage for 12 weeks at 113° F.

Example II

In another series of tests, silica ($SiO_2$) was added to the positive active material in a N.B.S. size S–5 silver oxide ($Ag_2O$)-zinc alkaline cell. In these cells, the positive active material ($Ag_2O$) also contained graphite in addition to 0.08% by weight of $SiO_2$. 2 layers of cellophane were used as the separator barrier material and 0.07 gram of electrolyte which was a 40% solution of KOH containing about 10% ZnO. About 0.11 gram of zinc negative active material and about 0.45 gram of silver oxide positive active material were used in each cell. The same discharge as in Example I (1,500 ohm, 16 hour/day) was used and each result represents a 3 cell average. The results were as follows:

| Additive | Initial 1.40 v. | Initial 0.90 v. | 6 wks. at 113° F. 1.40 v. | 6 wks. at 113° F. 0.90 v. | 6 mos. at room temp. 1.40 v. | 6 mos. at room temp. 0.90 v. |
|---|---|---|---|---|---|---|
| None | 57.8 | 69.6 | 42.7 | 51.7 | 48.3 | 56.9 |
| $SiO_2$ | 70.1 | 73.7 | 61.7 | 69.8 | 63.6 | 70.3 |

It is apparent that the silica improved initial capacity, and it was especially effective in stabilizing the cell during both room temperature storage and elevated temperature storage.

Example III

The effect of adding small amounts of silica to the positive active material of a N.B.S. size S–15 silver oxide ($Ag_2O$)-zinc alkaline cells was determined for varying amounts of silica. 0.17 gram of 40% KOH electrolyte, about 1 gram of silver oxide positive active material and about 0.27 gram of zinc negative active material were used in each cell. The cells were tested for initial capacity and stability during storage at room temperature for 6 months. Because the cell size used was different than in the previous examples, the discharge load was reduced to 625 ohms. Each result represents a 3 cell average indicating hours to the voltage endpoint.

| Percent $SiO_2$ | Initial 1.40 v. | Initial 0.90 v. | 6 mos. at room temp. 1.40 v. | 6 mos. at room temp. 0.90 v. |
|---|---|---|---|---|
| 0.00 | 53.3 | 75.8 | 40.0 | 65.0 |
| 0.05 | 54.0 | 75.0 | 52.0 | 75.0 |
| 0.10 | 52.0 | 80.8 | 56.0 | 77.2 |
| 0.15 | 53.3 | 81.3 | 52.4 | 74.6 |

Whereas there was only a slight improvement in initial cell capacity, the improvement in stability during storage at room temperature for 6 months was outstanding. In fact, there was practically no deterioration of capacity in those cells containing silica.

Example IV

The effect of adding small amounts of silica to the zinc active material in a silver oxide ($Ag_2O$)-zinc alkaline cell of the 312–GS size (not an N.B.S. size) was tested. 0.05 gram of electrolyte, about 0.06 gram of zinc negative active material and about 0.25 gram of silver oxide positive active material were used in each cell. The amount of silica was varied, the electrolyte contained about 46% KOH and 7.5% ZnO, and the cells were tested for initial capacity and stability during 2 weeks' storage at 145° F. The discharge load was 1,500 ohms and the results are reported as hours to a 0.90 volt endpoint.

| Additive | Amount, percent | Initial (0.90 v.) | 2 wks. at 145° F. (0.90 v.) |
|---|---|---|---|
| None | | 34.2 | 20.2 |
| $SiO_2$ | 0.1 | 38.6 | 27.2 |
| $SiO_2$ | 0.4 | 36.2 | 29.5 |

The silica when added in small amounts to the zinc active material slightly improved the initial capacity and substantially improved the stability during storage at 145° F.

Example V

The addition of silica to the zinc active material in a N.B.S. size S–10 silver oxide-zinc alkaline cell was also tested. The zinc particles were amalgamated with 14% Hg and contained varying amounts of $SiO_2$. 0.13 grams of electrolyte, about 0.6 grams of silver oxide positive active material and about 0.17 grams of zinc negative active material were used in each cell. The electrolyte contained about 46% KOH and about 7.5% ZnO. The discharge load was 625 ohms, and the results are reported as hours to a 0.90 volt endpoint.

| Additive | Amount, percent | Initial | 1 mo. at 113° F. | 2 wks. at 145° F. |
|---|---|---|---|---|
| None | | 41.6 | 38.0 | 30.8 |
| $SiO_2$ | 0.1 | 44.0 | 44.0 | 38.8 |
| $SiO_2$ | 0.4 | 46.5 | 43.2 | 42.2 |
| $SiO_2$ | 1.2 | 40.0 | 32.4 | 31.0 |

The silica additive improved initial capacity slightly and substantially improved stability. The 1.2% concentration was an excessive amount of silica in this particular cell for this rate of dicharge.

Example VI

The effect of adding small amounts of silica to the electrolyte was determined for a N.B.S. size S–10 silver oxide ($Ag_2O$)-zinc alkaline cell. The cells were tested for improvement in initial capacity and improved stability during storage at elevated temperatures. The same quantities of electrolyte and negative and positive active material as in Example V were used. The discharge load was 625 ohms, and the results are reported as hours to a 0.90 volt endpoint.

| Percent $SiO_2$ | Initial | 2 mos. at 113° F. | 2 wks. at 145° F. |
|---|---|---|---|
| 0 | 41.7 | 38.9 | 26.4 |
| 0.05 | 42.8 | 40.3 | 37.7 |
| 0.3 | 46.7 | 44.3 | 41.5 |
| 0.6 | 47.4 | 44.2 | 40.2 |
| 3.0 | 21.4 | 15.8 | 11.3 |

Small amounts of silica added to the electrolyte substantially improved the initial capacity and the stability during high temperature storage, but in this particular cell, the 3% concentration was an excessive amount of silica for this rate of discharge.

Example VII

Whereas all of the previous 6 examples have illustrated the addition of soluble silicon additives to silver oxide-zinc alkaline cells, the addition of silica to the electrolyte and positive active material in a mercuric oxide (HgO)-zinc alkaline cell was also tested in a N.B.S. size M–15 cell. 0.15 gram of electrolyte, about 0.25 gram zinc negative active material and about 1 gram of mercuric oxide positive active material were used in each cell. The separator barrier was cellophane and the electrolyte was a 40% KOH solution containing about 10% ZnO. The amount of silica was varied, and the cells were discharged through a 300 ohm load. The results are reported in hours to a 0.90 volt endpoint.

| Additive | Amount, percent | 1 mo. at 113° F. | 2 wks. at 145° F. |
|---|---|---|---|
| None | | 38.8 | 38.2 | 32.0 |
| $SiO_2$ (elec.) | 0.6 | 43.5 | 43.0 | 39.2 |
| $SiO_2$ (elec.) | 2.0 | 29.4 | 29.6 | 24.6 |
| $SiO_2$ (pos. mat.) | 0.1 | 45.3 | 44.3 | 41.6 |

The addition of silica to the positive active material and to the electrolyte improved initial capacity and stability during storage, but in this particular cell the 2% concentration in the electrolyte was excessive for this rate of discharge.

Example VIII

In addition to incorporating the soluble silicon additive into the positive active material, zinc active material and the electrolyte, treatment of the separator material was also tested. In these silver oxide-zinc alkaline cells, the barrier was omitted and only an absorbent cellulosic separator material (Webril) was used. One set of 10 cells employed a cellulosic absorbent which had been treated with silicon tetrachloride ($SiCl_4$) vapor and the other set of 10 cells used a non-treated cellulosic absorbent. The cells were stored for 2 weeks at 145° F. Only 1 of the 10 cells employing the $SiCl_4$ treated absorbent were shorted whereas 8 of the 10 cells with non-treated absorbent were shorted. This clearly demonstrates that the soluble silicon additive can be incorporated into the separator and provide improved stability during storage. Other methods for incorporating the soluble silicon additive into the separator may be used such as treatment of the barrier and/or the absorbent with vapors or solutions of other silicon compounds.

Whereas the above-examples illustrate the improvement of initial capacity and stability during storage for alkaline primary cells having silicate ions present in the electrolyte, this invention is also applicable to alkaline secondary systems, particularly sealed silver oxide-zinc secondary systems having limited cycle capability (e.g., 10 cycles or less). These secondary alkaline systems also encounter the problem of stability during storage, and improvement in stability and initial capacity should also be realized for these secondary systems in view of the similarity or identity of cell components. Although cell design for the secondary systems may be different, the same active materials and electrolyte are employed and the same cell reactions are involved, except for the fact that the secondary cells are recharged.

Having completely described this invention, what is claimed is:

1. An alkaline cell including the following components:
   (a) positive active material;
   (b) zinc negative active material;
   (c) a separator placed between said positive active material comprising a positive electrode and said zinc negative active material comprising a negative electrode;
   (d) alkaline electrolyte;
   characterized by:
   (1) said alkaline electrolyte being present in an amount sufficient only to provide wetting of the components without establishing a liquid level of free electrolyte in the cell, such that the electrolyte is contained substantially wholly within the separator and the positive and negative electrodes;
   and further characterized by:
   (2) a higher initial capacity and improved stability during storage provided by the presence of at least about 0.05% by weight of silicate ions in said alkaline electrolyte after thorough wetting of the cell components by said alkaline electrolyte.

2. An alkaline cell in accordance with claim 1 in which said silicate ions in said alkaline electrolyte are provided by a silicon additive sufficiently soluble in said electrolyte to provide said concentration of silicate ions.

3. An alkaline cell in accordance with claim 2 in which the soluble silicon additive is added to said positive active material.

4. An alkaline cell in accordance with claim 2 in which the soluble silicon additive is added to said alkaline electrolyte.

5. An alkaline cell in accordance with claim 2 in which the soluble silicon additive is silica.

6. An alkaline cell in accordance with claim 2 in which the positive active material is silver oxide.

7. An alkalne cell in accordance with claim 2 in which the soluble silicon additive is incorporated into one of said components in an amount sufficient to provide at least about 0.1% by weight of silicate ions in said alkaline electrolyte.

8. An alkaline cell in accordance with claim 7 in which the soluble silicon additive is silica.

9. An alkaline cell in accordance with claim 7 in which said positive active material is silver oxide.

10. An alkaline cell in accordance with claim 7 in which the positive active material is silver oxide, the soluble silicon additive is silica, and the silica is added to the silver oxide.

11. An alkaline cell including the following components:
   (a) positive active material;
   (b) zinc negative active material;
   (c) a separator placed between said positive active material comprising a positive electrode and said zinc negative active material comprising a negative electrode;
   (d) alkaline electrolyte;
   characterized by:
   (1) said alkaline electrolyte being present in an amount sufficient only to provide wetting of the components without establishing a liquid level of free electrolyte, such that the electrolyte is contained substantially wholly within the separator and the positive and negative electrodes, and said electrolyte containing a substantial amount of zinc in the form of zincate ions to minimize dissolution of said zinc negative active material in the electrolyte;
   and further characterized by:
   (2) a higher initial capacity and improved stability during storage provided by the presence of at least about 0.05% by weight of silicate ions in said alkaline electrolyte after thorough wetting of the cell components by said alkaline electrolyte.

12. An alkaline cell in accordance with claim 11 in which said silicate ions in said alkaline electrolyte are provided by incorporating silica into one of said cell components.

13. An alkaline cell in accordance with claim 11 in which the positive active material is silver oxide and said silicate ions are provided by incorporating silica in said silver oxide.

14. An alkaline cell in accordance with claim 11 in which said alkaline electrolyte is substantially saturated with zincate ions.

References Cited

UNITED STATES PATENTS

| | | | |
|---|---|---|---|
| 858,862 | 7/1907 | Edison | 136—157 |
| 1,541,699 | 6/1925 | Freeth et al. | 136—157 |
| 1,749,665 | 3/1930 | Diltz | 136—154 |
| 2,422,045 | 6/1947 | Ruben | 136—137 |
| 2,576,266 | 11/1951 | Ruben | 136—157 |
| 2,593,893 | 4/1952 | King | 136—107 |
| 2,606,941 | 8/1952 | Ruben | 136—111 |
| 2,941,909 | 6/1960 | Johnson et al. | 136—154 |
| 2,942,050 | 6/1960 | Denes | 136—3 |
| 2,962,540 | 11/1960 | Kordesch | 136—123 |
| 3,418,166 | 12/1968 | Carter. | |

WINSTON A. DOUGLAS, Primary Examiner

A. SKAPARS, Assistant Examiner

U.S. Cl. X.R.

136—95, 102, 107, 154